US008207692B2

(12) United States Patent
Holmberg et al.

(10) Patent No.: US 8,207,692 B2
(45) Date of Patent: Jun. 26, 2012

(54) MOORING WINCH AND A METHOD FOR CONTROLLING A CABLE OF A MOORING WINCH

(75) Inventors: Mikael Holmberg, Porvoo (FI); Vassili Jung, Espoo (FI)

(73) Assignee: ABB Oy, Helsinki (FI)

( * ) Notice: Subject to any disclaimer, the term of this patent is extended or adjusted under 35 U.S.C. 154(b) by 447 days.

(21) Appl. No.: 12/615,727

(22) Filed: Nov. 10, 2009

(65) Prior Publication Data

US 2010/0116191 A1 May 13, 2010

(30) Foreign Application Priority Data

Nov. 10, 2008 (EP) .................................... 08168700

(51) Int. Cl.
*B65H 23/198* (2006.01)
*B63B 21/00* (2006.01)
*H02P 6/12* (2006.01)

(52) U.S. Cl. ....... 318/6; 318/488; 318/400.15; 318/807; 114/230.1; 114/230.21

(58) Field of Classification Search .................. 318/3, 6, 318/430, 432, 488, 400.15, 807; 114/230.1
See application file for complete search history.

(56) References Cited

U.S. PATENT DOCUMENTS 4,048,547 A * 9/1977 Havard et al. ................. 318/488
4,272,706 A * 6/1981 Somerville ....................... 318/6
4,334,217 A * 6/1982 Nield et al. ................... 340/685
4,752,012 A * 6/1988 Juergens ....................... 212/278
6,594,592 B1 7/2003 Griepentrog et al.
6,653,804 B1 * 11/2003 Kureck ............................. 318/3
7,586,286 B2 * 9/2009 Cheng et al. .................. 318/807
2008/0116842 A1 * 5/2008 Cheng et al. .................. 318/807

FOREIGN PATENT DOCUMENTS

| | | |
|---|---|---|
| CN | 1319179 B1 | 7/2003 |
| EP | 0676365 | 10/1995 |
| FR | 2686835 | 8/1993 |
| GB | 2013375 | 8/1979 |
| WO | 0142126 | 6/2001 |

OTHER PUBLICATIONS

European Search Report dated Apr. 24, 2009, in European patent applications.
Translation of Chinese Office Action, dated Mar. 29, 2012, from corresponding application No. 200910207464.9.

* cited by examiner

*Primary Examiner* — Paul Ip
(74) *Attorney, Agent, or Firm* — Young & Thompson

(57) ABSTRACT

An electrically driven mooring includes a winding drum (101), an alternating current motor (103) arranged to drive the winding drum, a frequency conversion unit (104) connected to the alternating current motor, and a control unit (105) arranged to control the frequency conversion unit on the basis of an indicator for tension of the mooring rope. The control unit is arranged to compute a flux space vector for modelling a stator flux of the alternating current motor, to compute a torque estimate on the basis of the flux space vector and a space vector of stator currents, and to use the torque estimate as the indicator for the tension of the mooring rope. Hence, a need for a force sensor on the mooring rope and a need for a speed/position sensor on the motor shaft can be avoided.

17 Claims, 3 Drawing Sheets

MOORING WINCH AND A METHOD FOR CONTROLLING A CABLE OF A MOORING WINCH

FIELD OF THE INVENTION

The invention relates to a method for controlling mooring rope tension of a mooring winch. Furthermore, the invention relates to a mooring winch and to a computer program for controlling mooring rope tension of a mooring winch.

BACKGROUND

When a ship is moored alongside a wharf or a quay in a harbour, mooring ropes anchoring the ship must be properly tensioned so as to hold the ship in an appropriate position. If no effort is made to maintain the mooring ropes in correct tension, a hazardous situation might arise for the reason that the mooring ropes will become subjected to greater forces due to the tendency of the ship to move relative to the wharf or quay. There are a number of factors that may make the ship to move relative to the wharf or quay. These factors can be, for example, variations of the level of water surface due to the cyclic tidal changes and variations of the displacement of the ship due to cargo loading and/or unloading. These factors will cause the ship to vary its altitude with respect to the wharf or quay, and hence will vary the tension of the mooring ropes of a given length between ship and the wharf or quay. Furthermore, the ship might be rocked or rolled by waves or wind to induce a fluctuating tension in the mooring ropes. In a situation in which the movements have great amplitudes, the mooring ropes might fail, resulting in a danger to personnel in the near area and a risk of damages to the ship.

Publication EP0676365 discloses a winch having at least one winding drum that is connected to an electrical drive via a gearbox. The electrical drive is an asynchronous alternating current motor connected to a speed control device and fitted with a brake device. The speed control has a speed indicator for detecting an existing rotational speed. The speed control device is coordinated by a control unit which may be for example a programmable controller taking the detected rotational speed and a target value of the rotational speed as inputs. A critical part of the winch described above is the speed indicator that is susceptible to hard weather conditions especially when the winch is being used as an open deck machinery of a ship.

SUMMARY

In accordance with a first aspect of the invention, there is provided a new mooring winch. A mooring winch according to the invention comprises:

- a winding drum for winding a mooring rope,
- an alternating current motor arranged to drive the winding drum,
- a frequency conversion unit arranged to supply electrical power to the alternating current motor, and
- a control unit arranged to control the frequency conversion unit on the basis of an indicator for tension of the mooring rope, wherein the control unit is arranged to compute a flux space vector for modelling a stator flux of the alternating current motor, to compute a torque estimate on the basis of the flux space vector and a space vector of stator currents of the alternating current motor, and to use the torque estimate as the indicator for the tension of the mooring rope.

As the estimated torque is used as the indicator for the tension of the mooring rope, it is not necessary to provide the mooring rope with a force sensor and/or to provide the alternating current motor with a speed or position indicator.

In accordance with a second aspect of the invention, there is provided a new method for controlling mooring rope tension of a mooring winch that includes a winding drum for winding a mooring rope, an alternating current motor arranged to drive the winding drum, and a frequency conversion unit arranged to supply electrical power to the alternating current motor. A method according to the invention comprises:

- computing a flux space vector for modelling a stator flux of the alternating current motor,
- computing a torque estimate on the basis of the flux space vector and a space vector of stator currents of the alternating current motor,
- using the torque estimate as an indicator for tension of the mooring rope, and
- controlling the frequency conversion unit on the basis of the indicator for the tension of the mooring rope.

In accordance with a third aspect of the invention, there is provided a new computer program for controlling mooring rope tension of a mooring winch that includes a winding drum for winding a mooring rope, an alternating current motor arranged to drive the winding drum, and a frequency conversion unit arranged to supply electrical power to the alternating current motor. A computer program according to the invention comprises computer executable instructions for making a programmable processor to:

- compute a flux space vector for modelling a stator flux of the alternating current motor,
- compute a torque estimate on the basis of the flux space vector and a space vector of stator currents of the alternating current motor,
- use the torque estimate as an indicator for tension of the mooring rope, and
- control the frequency conversion unit on the basis of the indicator for the tension of the mooring rope.

In accordance with a fourth aspect of the invention, there is provided a new computer readable medium that is encoded with a computer program according to the invention.

A number of embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that does not exclude the existence of also unrecited features. The features recited in depending claims are mutually freely combinable unless otherwise explicitly stated.

BRIEF DESCRIPTION OF THE FIGURES

The exemplifying embodiments of the invention and their advantages are explained in greater detail below in the sense of examples and with reference to the accompanying drawings, in which.

DESCRIPTION OF THE EMBODIMENTS

Figure 1:
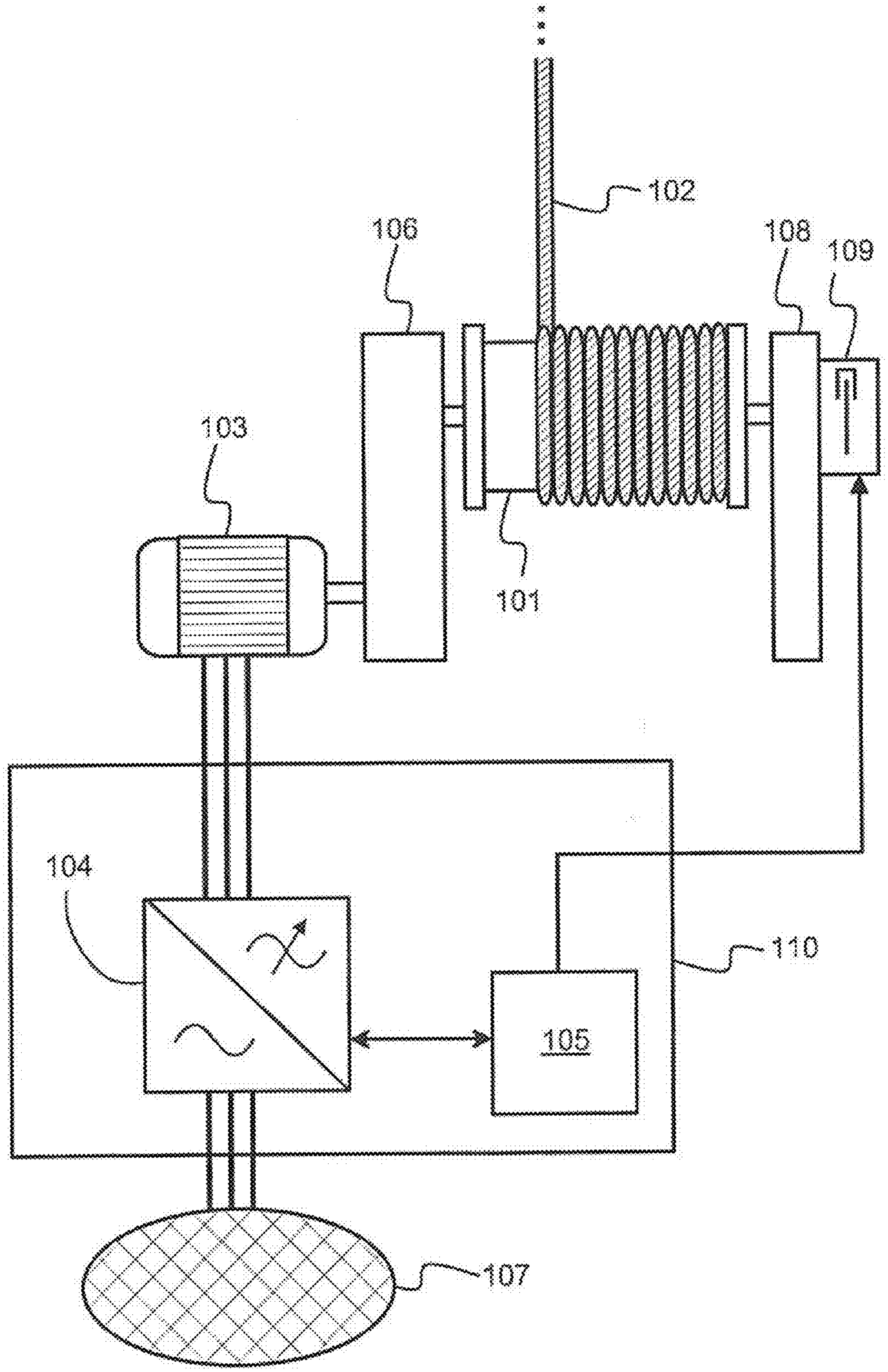
FIG. 1 shows a mooring winch according to an embodiment of the invention.

FIG. 1 shows a mooring winch according to an embodiment of the invention. The mooring winch comprises a winding drum 101 for winding a mooring rope 102 and an alternating current motor 103 arranged to drive the winding drum. The alternating current motor can be, for example, an induction motor or a permanent magnet synchronous motor. The mooring winch shown in FIG. 1 has a gearbox 106 between the alternating current motor 103 and the winding drum 101. The winding drum is supported with the gearbox and a bearing block 108. Depending on the dimensioning of the alternating current motor and the dimensioning of the winding drum, it is also possible to have a directly driven winding drum so that there is no need for a gearbox. The mooring winch comprises a frequency conversion unit 104 arranged to supply electrical power to the alternating current motor 103. The frequency conversion unit is connected to an electrical supply network 107 that can be e.g. an electrical network of a ship. The mooring winch comprises a control unit 105 arranged to control the frequency conversion unit on the basis of an indicator for tension [kN] of the mooring rope 102. The alternating current motor 103 is preferably driven in a speed controlled mode in such a manner that maximum mooring rope tension that can be created with the speed control is limited in order to avoid hazardous situations. The control unit 105 is preferably arranged to constitute a speed controller for realising the speed control of the alternating current motor. It is also possible to use a separate device arranged to constitute a speed controller. The control unit 105 is arranged to compute a flux space vector $\Psi$ for modelling a stator flux of the alternating current motor, and to compute a torque estimate $M_{est}$ on the basis of the flux space vector and a space vector i of stator currents of the alternating current motor. The torque estimate can be computed as:

$$M_{est}=\Psi\times i, \tag{1}$$

where "×" means the vector product (i.e. cross product). The control unit 105 is arranged to use the torque estimate as the indicator for the tension of the mooring rope. Hence, the mooring rope tension is being kept within allowed limits by keeping the torque estimate within allowed limits. The alternating current motor 103 can be controlled with a sensorless vector control, i.e. with vector control in which there is no speed and/or position indicator on the shaft of the alternating current motor. The sensorless vector control can be, for example, the open-loop direct torque control (DTC) in which the space vector v of the voltage supplied to the terminals of the alternating current motor is controlled in such a manner that the estimated torque $M_{est}$ and the amplitude of the flux space vector $|\Psi|$ are between desired limits.

The frequency conversion unit 104 and the control unit 105 can be separate devices or, alternatively, they can be parts of a frequency converter 110.

In a mooring winch according to an embodiment of the invention, the control unit 105 is arranged to carry out the following actions for starting an automatic mooring operation:

setting a reference value of rotational speed of the alternating current motor to zero, releasing a brake 109 of the mooring winch, computing a first value of the torque estimate in the situation in which the reference value of the rotational speed has been set to zero and the brake has been released, and determining whether the mooring rope is to be wound in or out on the basis of the first value of the torque estimate and a pre-determined set value of torque.

The pre-determined set value of torque is an upper limit for the target value of the torque produced by the alternating current motor. If the first value of the torque estimate is significantly higher than the pre-determined set value, the mooring rope is too tight and the mooring rope shall be wound out. Correspondingly, if the first value of the torque estimate is significantly lower than the pre-determined set value, the mooring rope is too slack and the mooring rope shall be wound in. It is also undesirable that the mooring rope is too slack since a slack mooring rope allows harmful mechanical movements.

In a mooring winch according to an embodiment of the invention, the control unit 105 is arranged to carry out the following successive phases for accomplishing a periodical mooring operation:

phase A: energizing the alternating current motor so that the reference value of rotational speed of the alternating current motor is zero, phase B: releasing the brake 109 of the mooring winch, phase C: computing the torque estimate in the situation in which the reference value of the rotational speed is zero and the brake has been released, conditional phase D: controlling the alternating current motor to wind the mooring rope in as a response to a situation in which the computed torque estimate is lower than a first limit value H−, conditional phase E: controlling the alternating current motor to wind the mooring rope out as a response to a situation in which the computed torque estimate exceeds a second limit value H+, and phase F: closing the brake, de-energizing the alternating current motor, waiting for a pre-determined time interval, and continuing from the phase A.

The above-mentioned second limit value is greater than or equal to the above-mentioned first limit value, i.e. $H+\geqq H-$.

In a mooring winch according to another embodiment of the invention, the control unit 105 is arranged to keep the alternating current motor continuously energized and controlled in order to provide continuous mooring operation.

The periodical mooring operation saves energy compared to the continuous mooring operation because, in the periodical mooring operation, the alternating current motor is de-energized during a significant portion of time.

A mooring winch according to an embodiment of the invention comprises a control interface for enabling selection between the above-described periodical mooring operation and the continuous mooring operation.

There are different ways to realize the brake of the mooring winch. For example, the brake can be arranged as depicted in FIG. 1, or the brake can be integrated with the motor 103, or the brake can be integrated with the gearbox 106, or there can be a brake in conjunction with more than one of the following: the motor, the gearbox, and the bearing block 108. The brake can be, for example, a disc brake or a drum brake.

Figure 2A:
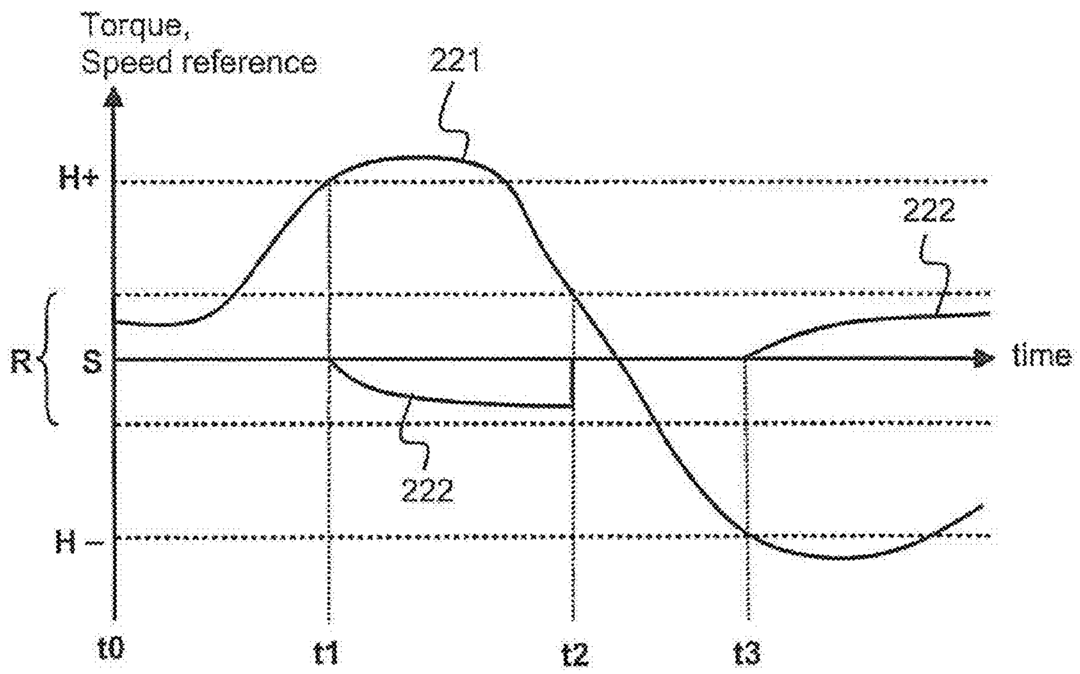
FIGS. 2*a* and 2*b* illustrate operation of mooring winches according to embodiments of the invention in exemplifying situations.

FIG. 2*a* illustrates operation of mooring winches according to embodiments of the invention in exemplifying situations. The curve 221 represents the torque estimate and the curve 222 represents a speed reference of the alternating current motor. It should be noted that the speed reference 222 coincides with the time-axis during time intervals t0 . . . t1 and t2 . . . t3. The term "speed reference" means here the reference value of the rotational speed of the alternating current motor 103 (FIG. 1). The reference value of the rotational speed and is not necessarily constant but it can vary over time.

In a mooring winch according to an embodiment of the invention, the control unit 105 (FIG. 1) is arranged to make the alternating current motor 103 (FIG. 1) to wind the mooring rope 102 (FIG. 1) in as a response to a situation in which the torque estimate 221 goes below a first pre-determined hysteresis limit value H−, and to make the alternating current motor to wind the mooring rope out as a response to a situation in which the torque estimate exceeds a second pre-determined hysteresis limit value H+. The second pre-determined hysteresis limit value H+ is greater than the first pre-determined hysteresis limit value H−. In this document, the sign of the rotational speed of the alternating current motor is chosen in such a manner that the mooring rope is wound in, i.e. the mooring rope tension is increased, when the alternating current motor has a positive direction of rotation. Hence, the mooring rope can be wound in by making the speed reference 222 positive and the mooring rope can be wound out by making the speed reference 222 negative. In the exemplifying situation shown in FIG. 2*a*, the torque estimate exceeds the hysteresis limit value H+ at the time instant t1 and thus the speed reference 222 is made negative in order to reduce the mooring rope tension. At the time instant t3, the torque estimate goes below the hysteresis limit value H− and thus the speed reference is made positive in order to increase the mooring rope tension.

In a mooring winch according to an embodiment of the invention, the control unit 105 (FIG. 1) is arranged to set the speed reference 222 to zero as a response to a situation in which the torque estimate 221 is within a pre-determined range R.

The pre-determined range R is around a pre-determined set value S of torque. The pre-determined set value S can be an upper limit for a target value of torque, the target value of torque being for example an output of a speed controller and being able to vary over time. In the exemplifying situation shown in FIG. 2*a*, the estimated torque 221 gets into the pre-determined range R at the time instant t2 and thus the speed reference 222 is set to zero at the time instant t2.

Figure 2B:
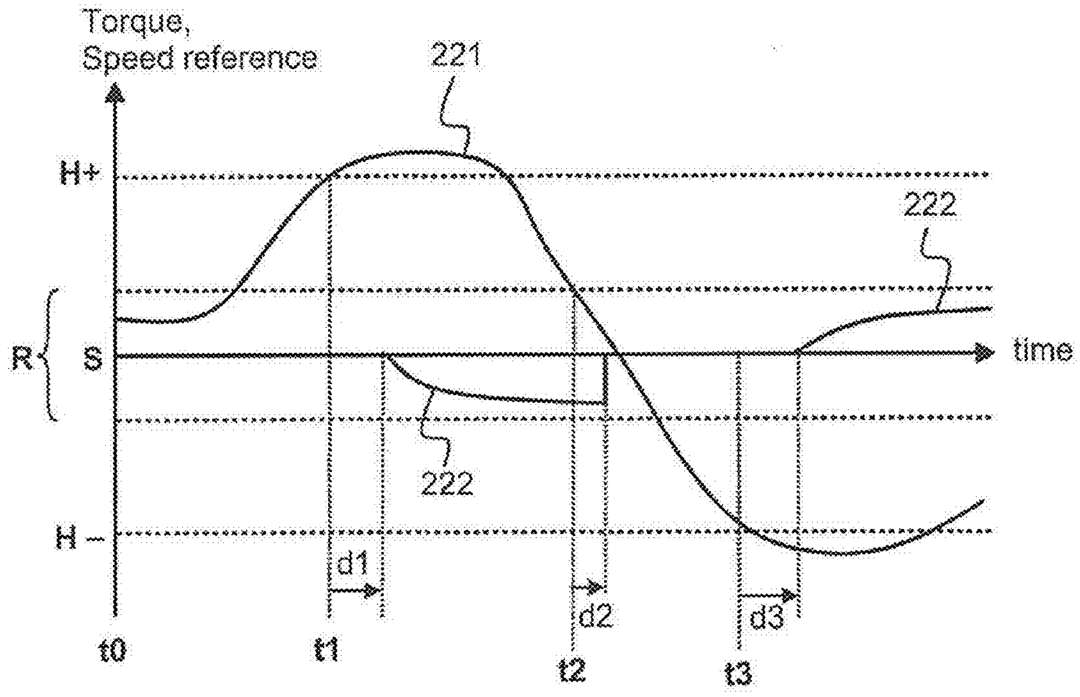

FIG. 2*b* illustrates operation of mooring winches according to embodiments of the invention in exemplifying situations. The curve 221 represents the torque estimate and curve 222 represents a speed reference of the alternating current motor. Please, note that the speed reference 222 coincides with the time-axis during time intervals t0 . . . t1+d1 and t2+d2 . . . t3+d3.

In a mooring winch according to an embodiment of the invention, the control unit 105 (FIG. 1) is arranged to make the alternating current motor 103 (FIG. 1) to wind the mooring rope 102 (FIG. 1) in as a response to a situation in which a first pre-determined delay d3 has elapsed after the torque estimate 221 went below the hysteresis limit value H−, and to make the alternating current motor to wind the mooring rope out as a response to a situation in which a second pre-determined delay d1 has elapsed after the torque estimate 221 exceeded the hysteresis limit value H+. In the exemplifying situation shown in FIG. 2*b*, the torque estimate exceeds the hysteresis limit value H+ at the time instant t1 and thus the speed reference 222 is made negative after the delay d1 in order to reduce the mooring rope tension. At the time instant t3, the torque estimate goes below the hysteresis limit value H− and thus the speed reference is made positive after the delay d3 in order to increase the mooring rope tension. With the aid of the said delays it is possible to avoid unnecessary, and possibly oscillating, control actions for example in a situation in which the torque estimate 221 oscillates around one of the said hysteresis limits H+ and H−.

In a mooring winch according to an embodiment of the invention, the control unit 105 (FIG. 1) is arranged to set the speed reference 222 to zero as a response to a situation in which a pre-determined delay d2 has elapsed after the torque estimate 221 entered the pre-determined range R. In the exemplifying situation shown in FIG. 2*a*, the estimated torque 221 gets into the pre-determined range R at the time instant t2 and thus the speed reference 222 is set to zero at the time instant t2+d2.

In a mooring winch according to an embodiment of the invention, the control unit 105 (FIG. 1) is arranged to constitute a speed controller for controlling the rotational speed of the alternating current motor 103 (FIG. 1). An output of the speed controller is a target value of torque that can vary over time. The pre-determined set value S of torque is preferably an upper limit for the target value of torque.

Figure 3:
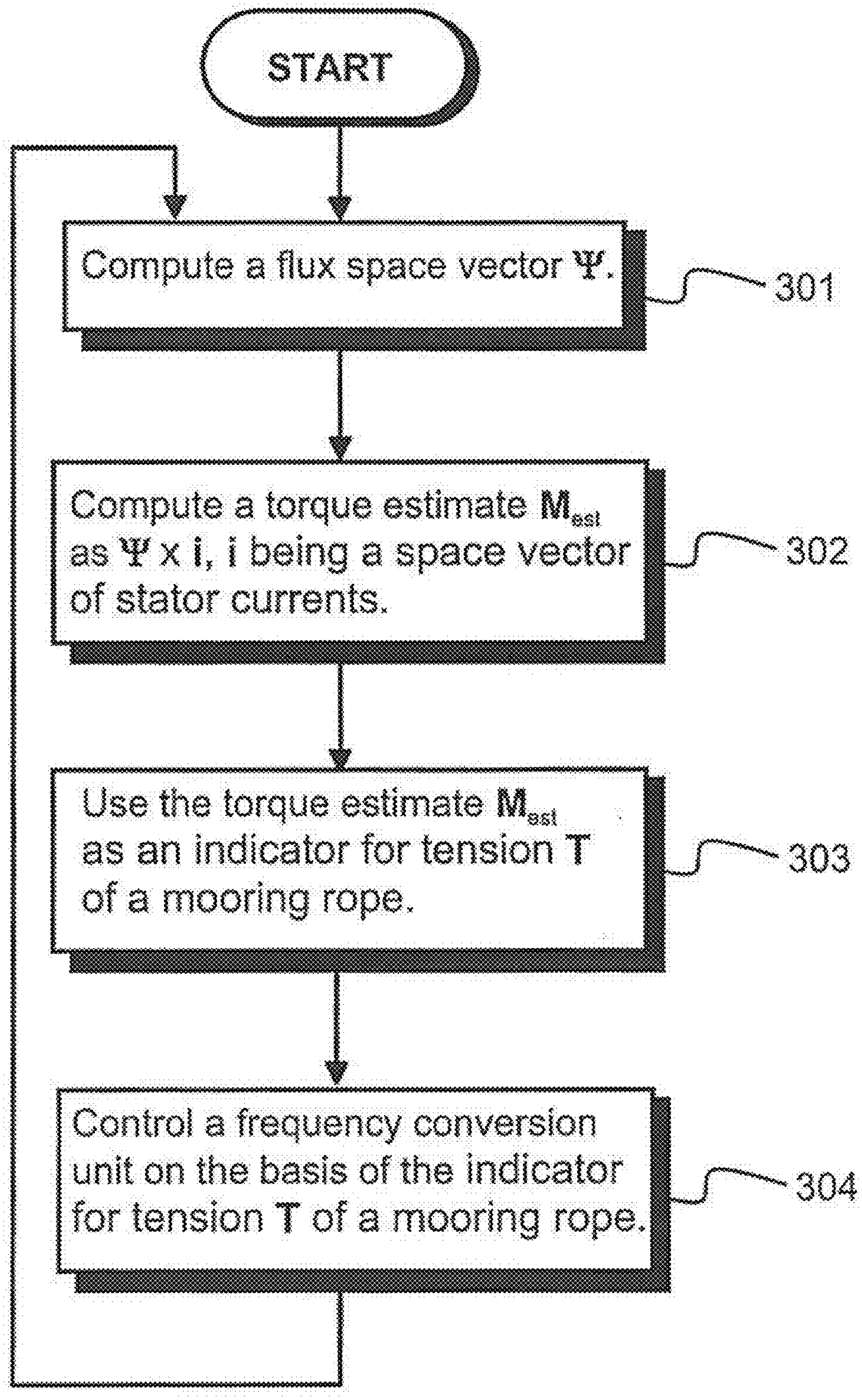
FIG. 3 is a flow chart of a method according to an embodiment of the invention for controlling mooring rope tension of a mooring winch.

FIG. 3 is a flow chart of a method according to an embodiment of the invention for controlling mooring rope tension of a mooring winch. The method comprises:

- computing, in phase 301, the flux space vector Ψ for modelling a stator flux of the alternating current motor 103 (FIG. 1),
- computing, in phase 302, a torque estimate $M_{est}$ on the basis of the flux space vector and the space vector i of stator currents of the alternating current motor, $M_{est}$ can be computed as $M_{est}=\Psi\times i$,
- using, in phase 303, the torque estimate as an indicator for tension T of the mooring rope 102 (FIG. 1), and
- controlling, in phase 304, the frequency conversion unit 104 (FIG. 1) on the basis of the indicator for the tension T of the mooring rope.

A method according to an embodiment of the invention further comprises the following actions for starting an automatic mooring operation:

- setting a reference value of the rotational speed of the alternating current motor to zero,
- releasing a brake of the mooring winch,
- computing a first value of the torque estimate in the situation in which the reference value of the rotational speed has been set to zero and the brake has been released, and
- determining whether the mooring rope is to be wound in or out on the basis of the first value of the torque estimate and a pre-determined set value of torque.

A method according to an embodiment of the invention comprises the following successive phases for accomplishing a periodical mooring operation:

- phase A: energizing the alternating current motor so that the reference value of rotational speed of the alternating current motor is zero,
- phase B: releasing the brake of the mooring winch,
- phase C: computing the torque estimate in the situation in which the reference value of the rotational speed is zero and the brake has been released,
- conditional phase D: controlling the alternating current motor to wind the mooring rope in as a response to a situation in which the computed torque estimate is lower than a first limit value H−,
- conditional phase E: controlling the alternating current motor to wind the mooring rope out as a response to a situation in which the computed torque estimate exceeds a second limit value H+, and
- phase F: closing the brake, de-energizing the alternating current motor, waiting for a pre-determined time interval, and continuing from the phase A.

The above-mentioned second limit value is greater than or equal to the above-mentioned first limit value, i.e. H+≧H−.

In a method according to another embodiment of the invention, the alternating current motor is continuously energized and controlled in order to provide continuous mooring operation.

A method according to an embodiment of the invention comprises selection between the above-described periodical mooring operation and the continuous mooring operation.

In a method according to an embodiment of the invention, the alternating current motor is controlled to wind the mooring rope in as a response to a situation in which the torque estimate 221 (FIG. 2*a*) goes below a first pre-determined limit value H− (FIG. 2*a*), and the alternating current motor is controlled to wind the mooring rope out as a response to a situation in which the torque estimate 221 (FIG. 2*a*) exceeds a second pre-determined limit value H+ (FIG. 2*a*), the second pre-determined limit value being greater than the first pre-determined limit value.

In a method according to an embodiment of the invention, a reference value 222 (FIG. 2*a*) of rotational speed of the alternating current motor is set to zero as a response to a situation in which the torque estimate 221 (FIG. 2*a*) is within a pre-determined range R (FIG. 2*a*), the pre-determined range being around a pre-determined set value S (FIG. 2*a*) of torque.

In a method according to an embodiment of the invention, the alternating current motor is controlled to wind the mooring rope in as a response to a situation in which a first pre-determined delay d3 (FIG. 2*b*) has elapsed after the torque estimate 221 (FIG. 2*b*) went below the first pre-determined limit value H− (FIG. 2*b*), and the alternating current motor is controlled to wind the mooring rope out as a response to a situation in which a second pre-determined delay d1 (FIG. 2*b*) has elapsed after the torque estimate 221 (FIG. 2*b*) exceeded the second pre-determined limit value H+ (FIG. 2*b*), the second pre-determined limit value being greater than the first pre-determined limit value.

In a method according to an embodiment of the invention, the reference value 222 (FIG. 2*b*) of rotational speed of the alternating current motor is set to zero as a response to a situation in which a pre-determined delay d2 (FIG. 2*b*) has elapsed after the torque estimate 221 (FIG. 2*b*) entered a pre-determined range R, the pre-determined range being around a pre-determined set value S (FIG. 2*b*) of torque.

In a method according to an embodiment of the invention, the pre-determined set value S (FIGS. 2*a* and 2*b*) of torque is an upper limit for a target value of torque, the target value of torque being an output of a speed controller arranged to control the rotational speed of the alternating current motor.

A computer program according to an embodiment of the invention comprises computer executable instructions for controlling mooring rope tension of a mooring winch that includes a winding drum for winding a mooring rope, an alternating current motor arranged to drive the winding drum, and a frequency conversion unit arranged to supply electrical power to the alternating current motor. The above-mentioned computer executable instructions are capable of controlling a programmable processor to:

compute a flux space vector for modelling a stator flux of the alternating current motor, compute a torque estimate on the basis of the flux space vector and a space vector of stator currents of the alternating current motor, use the torque estimate as an indicator for tension of the mooring rope, and control the frequency conversion unit on the basis of the indicator for the tension of the mooring rope.

A computer readable medium according to an embodiment of the invention is encoded with a computer program according to an embodiment of the invention. The computer readable medium can be, for example, an optical compact disc read only memory (CD-ROM).

A signal according to an embodiment of the invention is adapted to carry information specifying a computer program according to an embodiment of the invention.

The specific examples provided in the description given above should not be construed as limiting. Therefore, the invention is not limited merely to the embodiments described above, many variants being possible.

What is claimed is:

1. A mooring winch comprising:

a winding drum for winding a mooring rope, an alternating current motor arranged to drive the winding drum, a frequency conversion unit arranged to supply electrical power to the alternating current motor, and a control unit arranged to control the frequency conversion unit on the basis of an indicator for tension of the mooring rope, wherein the control unit is arranged to compute a flux space vector for modelling a stator flux of the alternating current motor, to compute a torque estimate on the basis of the flux space vector and a space vector of stator currents of the alternating current motor, and to use the torque estimate as the indicator for the tension of the mooring rope.

2. A mooring winch according to claim 1, wherein the control unit is arranged to:

set a reference value of rotational speed of the alternating current motor to zero, release a brake of the mooring winch, compute a first value of the torque estimate in the situation in which the reference value of the rotational speed has been set to zero and the brake has been released, and determine whether the mooring rope is to be wound in or out on the basis of the first value of the torque estimate and a pre-determined set value of torque.

3. A mooring winch according to claim 1, wherein the control unit is arranged to make the alternating current motor to wind the mooring rope in as a response to a situation in which the torque estimate goes below a first pre-determined limit value, and to make the alternating current motor to wind the mooring rope out as a response to a situation in which the torque estimate exceeds a second pre-determined limit value, the second pre-determined limit value being greater than the first pre-determined limit value.

4. A mooring winch according to claim 3, wherein the control unit is arranged to set a reference value of rotational speed of the alternating current motor to zero as a response to a situation in which the torque estimate is within a pre-determined range, the pre-determined range being around a pre-determined set value of torque.

5. A mooring winch according to claim 1, wherein the control unit is arranged to make the alternating current motor to wind the mooring rope in as a response to a situation in which a first pre-determined delay has elapsed after the torque estimate went below a first pre-determined limit value, and to make the alternating current motor to wind the mooring rope out as a response to a situation in which a second pre-determined delay has elapsed after the torque estimate exceeded a second pre-determined limit value, the second pre-determined limit value being greater than the first pre-determined limit value.

6. A mooring winch according to claim 5, wherein the control unit is arranged to set a reference value of rotational speed of the alternating current motor to zero as a response to a situation in which a pre-determined delay has elapsed after the torque estimate entered a pre-determined range, the pre-determined range being around a pre-determined set value of torque.

7. A mooring winch according to claim 2, wherein the control unit is arranged to constitute a speed controller for controlling the rotational speed of the alternating current motor, an output of the speed controller being a target value of torque and the pre-determined set value of torque being an upper limit for the target value of torque.

8. A mooring winch according to claim 1, wherein the control unit is arranged to carry out the following successive phases for accomplishing a periodical mooring operation:

phase A: energizing the alternating current motor so that a reference value of rotational speed of the alternating current motor is zero, phase B: releasing a brake of the mooring winch, phase C: computing the torque estimate in the situation in which the reference value of the rotational speed is zero and the brake has been released, conditional phase D: controlling the alternating current motor to wind the mooring rope in as a response to a situation in which the computed torque estimate is lower than a first limit value, conditional phase E: controlling the alternating current motor to wind the mooring rope out as a response to a situation in which the computed torque estimate exceeds a second limit value, and phase F: closing the brake, de-energizing the alternating current motor, waiting for a pre-determined time interval, and continuing from the phase A.

9. A method for controlling mooring rope tension of a mooring winch that comprises a winding drum for winding a mooring rope, an alternating current motor arranged to drive the winding drum, and a frequency conversion unit arranged to supply electrical power to the alternating current motor, the method comprising:

controlling the frequency conversion unit on the basis of an indicator for tension of the mooring rope, computing a flux space vector for modelling a stator flux of the alternating current motor, computing a torque estimate on the basis of the flux space vector and a space vector of stator currents of the alternating current motor, and using the torque estimate as the indicator for the tension of the mooring rope.

10. A method according to claim 9, wherein the method comprises:

setting a reference value of rotational speed of the alternating current motor to zero, releasing a brake of the mooring winch, computing a first value of the torque estimate in the situation in which the reference value of the rotational speed has been set to zero and the brake has been released, and determining whether the mooring rope is to be wound in or out on the basis of the first value of the torque estimate and a pre-determined set value of torque.

11. A method according to claim 9, wherein the alternating current motor is controlled to wind the mooring rope in as a response to a situation in which the torque estimate goes below a first pre-determined limit value, and the alternating current motor is controlled to wind the mooring rope out as a response to a situation in which the torque estimate exceeds a second pre-determined limit value, the second pre-determined limit value being greater than the first pre-determined limit value.

12. A method according to claim 11, wherein a reference value of rotational speed of the alternating current motor is set to zero as a response to a situation in which the torque estimate is within a pre-determined range, the pre-determined range being around a pre-determined set value of torque.

13. A method according to claim 9, wherein the alternating current motor is controlled to wind the mooring rope in as a response to a situation in which a first pre-determined delay has elapsed after the torque estimate went below a first pre-determined limit value, and the alternating current motor is controlled to wind the mooring rope out as a response to a situation in which a second pre-determined delay has elapsed after the torque estimate exceeded a second pre-determined limit value, the second pre-determined limit value being greater than the first pre-determined limit value.

14. A method according to claim 9, wherein the method comprises the following successive phases for accomplishing a periodical mooring operation:

phase A: energizing the alternating current motor so that a reference value of rotational speed of the alternating current motor is zero, phase B: releasing a brake of the mooring winch, phase C: computing the torque estimate in the situation in which the reference value of the rotational speed is zero and the brake has been released, conditional phase D: controlling the alternating current motor to wind the mooring rope in as a response to a situation in which the computed torque estimate is lower than a first limit value, conditional phase E: controlling the alternating current motor to wind the mooring rope out as a response to a situation in which the computed torque estimate exceeds a second limit value, and phase F: closing the brake, de-energizing the alternating current motor, waiting for a pre-determined time interval, and continuing from the phase A.

15. A computer readable medium encoded with a computer program for controlling mooring rope tension of a mooring winch that comprises a winding drum for winding a mooring rope, an alternating current motor arranged to drive the winding drum, and a frequency conversion unit arranged to supply electrical power to the alternating current motor, the computer program comprising computer executable instructions for making a programmable processor to:

control the frequency conversion unit on the basis of an indicator for tension of the mooring rope, compute a flux space vector for modelling a stator flux of the alternating current motor, compute a torque estimate on the basis of the flux space vector and a space vector of stator currents of the alternating current motor, and use the torque estimate as the indicator for the tension of the mooring rope.

16. A mooring winch according to claim 4, wherein the control unit is arranged to constitute a speed controller for controlling the rotational speed of the alternating current motor, an output of the speed controller being a target value of torque and the pre-determined set value of torque being an upper limit for the target value of torque.

17. A mooring winch according to claim 6, wherein the control unit is arranged to constitute a speed controller for controlling the rotational speed of the alternating current motor, an output of the speed controller being a target value of torque and the pre-determined set value of torque being an upper limit for the target value of torque.

* * * * *